April 4, 1939.  F. W. KNOTT  2,153,255

BUTTER DISPENSING DEVICE

Original Filed Feb. 6, 1936  2 Sheets-Sheet 1

INVENTOR.
FRANK W. KNOTT.
BY Ralph L. Binns
ATTORNEY.

April 4, 1939.　　　　　F. W. KNOTT　　　　　2,153,255
BUTTER DISPENSING DEVICE
Original Filed Feb. 6, 1936　　2 Sheets-Sheet 2
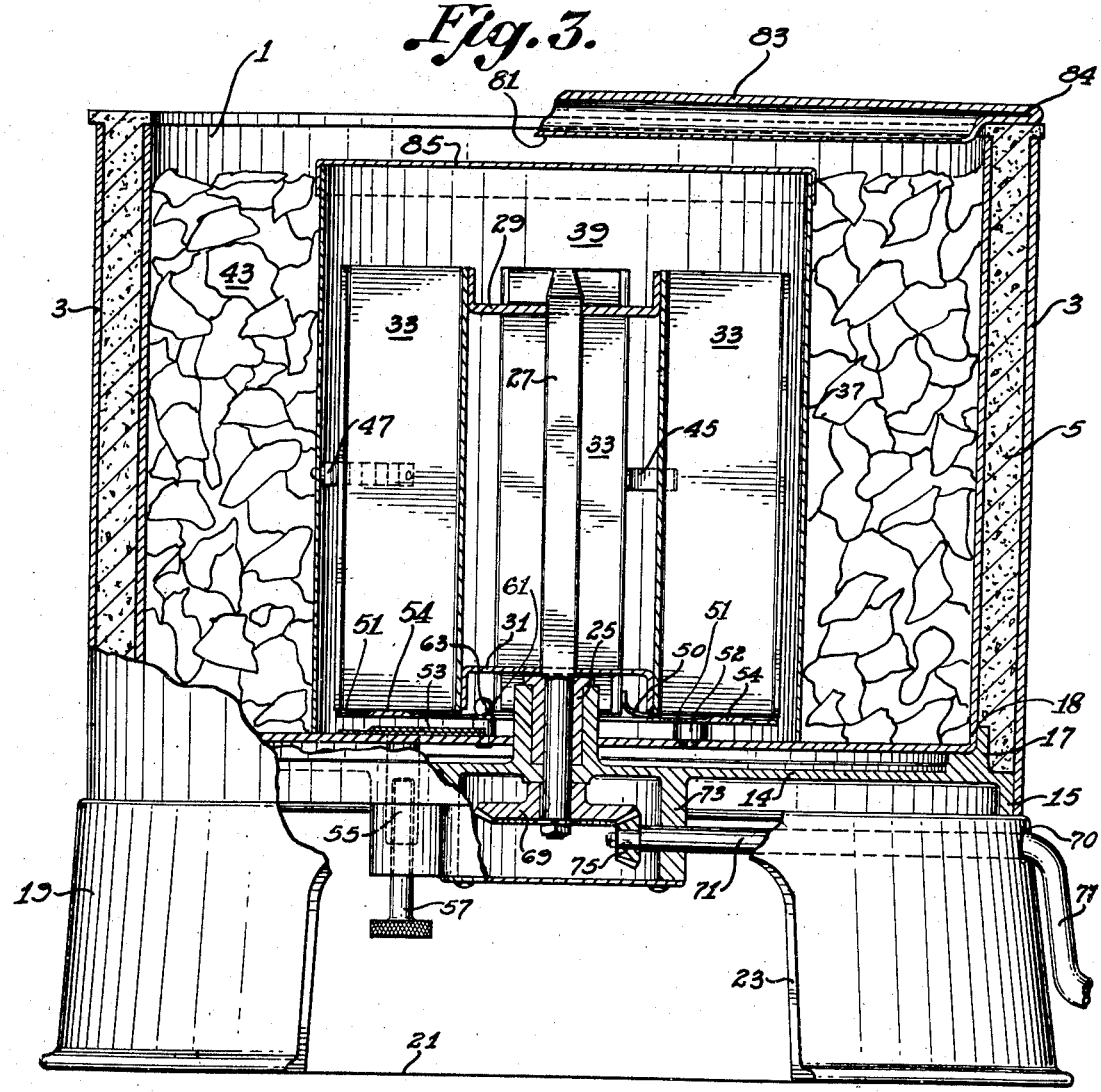
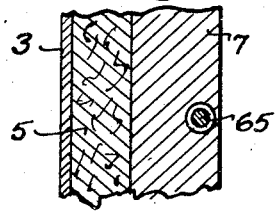
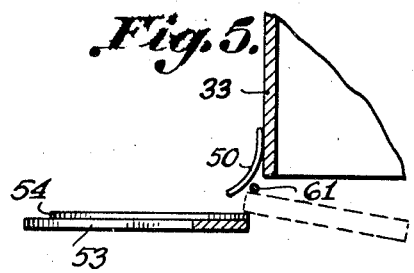
INVENTOR.
FRANK W. KNOTT.
BY
ATTORNEY.

// Patented Apr. 4, 1939

2,153,255

UNITED STATES PATENT OFFICE 2,153,255

BUTTER DISPENSING DEVICE

Frank W. Knott, Detroit, Mich., assignor, by mesne assignments, to National Sanitary Butter Dispenser, Inc., a corporation of Michigan Application February 6, 1936, Serial No. 62,577
Renewed September 19, 1938

24 Claims. (Cl. 31—21)

My invention pertains to a dispensing device and more particularly to a machine for cutting a large piece of butter into small pats suitable for serving.

It is an object of my invention to provide a butter cutting and dispensing machine of simple construction and positive operation which is conveniently chargeable and adjustable for use in cutting large pieces of butter into small pats suitable for serving in hotels, restaurants and other places.

It is a further object of my invention to provide a refrigerated butter cutting and dispensing machine comprising means for automatically cutting pats of butter of adjustable thickness from a larger piece of butter in a refrigerated compartment and for automatically discharging the pat of butter from the cutting means.

It is also an object of my invention to provide a butter cutting and dispensing machine comprising a rotatable butter carrier having vertically disposed chutes for receiving large pieces of butter slidably disposed therein, and having a pair of stop-plates for limiting the protrusion of the pieces of butter from the lower ends of the chutes, one of said stop-plates being vertically adjustable for determining the thickness of the pat of butter which is cut from the protruding pieces as they approach a tensioned butter cutting wire, mounted adjacent the edge of the adjustable plate.

The invention itself, however, both as to its construction and its operation together with additional objects and advantages thereof, will best be understood from the following description of a specific embodiment when read in conjunction with the appended drawings in which.

Figure 1:
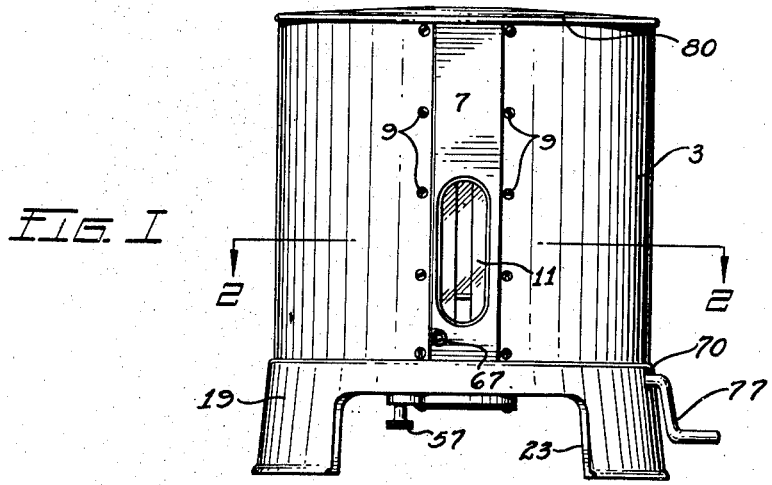
Fig. 1 is a front elevational view of my butter cutting and dispensing machine.
Figure 2:
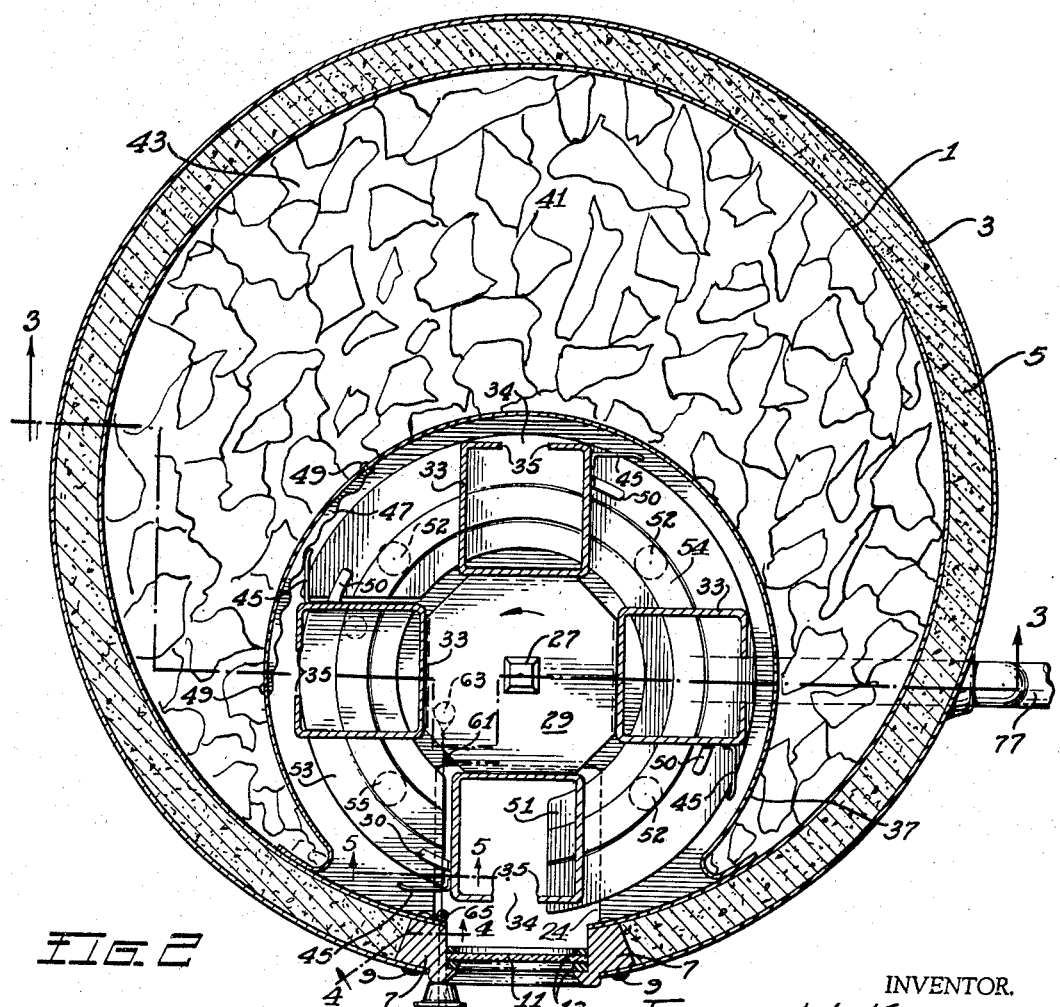
Fig. 2 is a transverse sectional view taken on line 2—2 thereof.

Fig. 3 is a front elevational view partially broken away and sectioned on line 3—3 of Fig. 2; and Figs. 4 and 5 are fragmentary enlarged sectional views taken on lines 4—4 and 5—5 of Fig. 2.

Referring more particularly to the drawings, my butter cutting and dispensing machine comprises a heat insulating enclosure consisting of a sheet metal shell 1 of substantially cylindrical conformation open at one end and surrounded by a larger cylindrical shell 3 in concentrically disposed relation. An annular insulating space is provided between the sheet metal shells which is preferably packed with heat insulating material 5 of any well-known character.

A window frame 7 is inserted in one side of the heat insulating enclosure having its edges secured between the outer and inner shells 3 and 1 of the enclosure, as by suitable screws 9 extending therethrough. The lower portion of the window frame 7 is provided with an aperture for receiving a piece of glass 11 preferably inserted between gasket-like members 13.

A base plate 14 is provided which comprises means for securing the shells 1 and 3 in concentrically disposed relation. For this purpose the base plate is provided with an angularly turned flange 15 by which it is secured to the large outer shell 3 in any suitable manner, as by welding. An annular flange 17 of smaller diameter projects upwardly from the opposite side of the base plate 14 and is provided with an annular groove 18 which is cut out from its inner edge to provide a seat to receive the lower corner and edge of the inner shell 1, which is secured therein in any suitable manner.

A pedestal member 19 is secured to the lower edge of the heat insulating enclosure for supporting it in spaced relation above a table 21 or any other surface upon which the device may be installed. The pedestal member 19 has an aperture 23 for conveniently adjusting the machine and for removing the butter pats therefrom. A discharge outlet 24 is provided, as shown in Fig. 2, for discharging butter pats through the bottom of the shell 1 and the base plate 14.

The base plate 14 is provided with suitable bearing means 25 through which a shaft 27 is journalled and projects vertically into the space within the enclosure. A butter carrier is rotatably supported on the portion of said shaft which projects into the enclosure and comprises bracket plates 29 and 31 which are detachably secured to the shaft 27 in spaced relation in any suitable manner, as by making the shaft square and making square cut holes in said plates, as shown in Fig. 2 for example. This not only facilitates assembly but permits ready removal of the butter carrier for cleaning and inspecting.

The corners of the bracket plates 29 and 31 are angularly turned to facilitate attachment to a plurality of butter receiving chutes 33 which may be welded thereto. The bracket plates are preferably square with angularly turned corners for convenient attachment to carry four of the butter receiving chutes 33 in vertically disposed positions which are preferably made of non-corrosive metal.

The butter receiving chutes 33 are open at the top and bottom ends and they are of substantially square cross-section providing an open slot 34 along the outwardly disposed side, and each chute is constructed by folding a rectangular piece of sheet metal to provide three-closed sides, as shown in Fig. 2, with narrow inturned marginal portions 35 only partially closing the fourth side remote from the bracket plates. A substantially cylindrical partition 37 of sheet metal is provided within the heat insulating enclosure to one side of which it is secured in eccentric relation and hermetically sealed thereto in any suitable manner, as by welding. The edges of the eccentrically disposed partition 37 are secured to the outer shell on opposite sides of the window frame 7 providing an inner cutter compartment opening therefrom. The partition 37 thus provides a butter compartment 39 which is substantially surrounded by a refrigerant compartment 41 which may be packed with any suitable refrigerant 43.

In order to free the butter from the walls of the chute, I provide means for flexing and vibrating the back wall, said means being shown as a unidirectional control, comprising a resilient dog 45 secured to and extending backwardly from the outer corner of each chute and cooperatively engaging a corrugated rack member 47 which is secured to the cylindrical partition 37 in any suitable manner, as by rivets 49, for example. The corrugated rack member 47 preferably extends approximately one-fourth of the distance around the cylindrical partition whereby it is continuously engaged by one or another of the fingers 45 carried by the butter chutes for preventing backward rotation of the butter carrier. The back or follower wall of each butter chute also supports a resilient butter discharging finger 50 which is projected downwardly therefrom for a purpose to be subsequently set forth.

Pieces of butter which are to be divided by the machine are inserted into the open upper ends of the chutes 33, which are of a suitable size for receiving the one-fourth pound cakes of butter of the usual rectangular shape. Under the lower ends of the rotatable chutes 33 a stationary stop-plate 51 is supported by screws 52 secured in the bottom of the inner shell and it serves to limit the movement of the butter downwardly in the chute. The stationary stop-plate 51 is of substantially arcuate formation and extends more than one-half of the way around the path of rotation of the chute.

For permitting the pieces of butter to protrude a pre-determined adjustable distance below the lower ends of the butter chutes 33, a second stop-plate 53 is mounted on the base plate and secured at the rear end by adjustable means 55 whereby, upon turning a thumb screw 57, it may be lowered or raised to permit a protruded portion of butter of the desired thickness to extend from the lower end of each chute as it passes over. The adjustable stop-plate 53 is likewise of substantially arcuate conformation and it extends around approximately one-fourth of the path of revolution of the chutes, being spaced from the stationary plate. As the chutes revolve beyond the end of the stationary stop-plate in the direction of the adjustable plate, the respective pieces of butter, which are slidably disposed therein, drop down to engage the adjustable stop-plate 53 at a lower level. A ridge or raised portion 54, on the upper face of each stop-plate, serves for directly engaging the butter to prevent it sticking and smearing over the plate.

As each chute continues to revolve after the butter engages the adjustable plate 53, it carries the protruded portion of the large piece of butter into operative engagement with a butter cutting member which comprises a fine wire 61 which is tensioned between a stationary anchor pin 63 and an adjustable bolt 65 extending slidably through the edge of the pedestal 19, as shown in Fig. 4. The outermost end of the slidable bolt 65 is threaded to receive an adjustable knob 67 by which the tension of the wire 61 may be regulated. The butter cutting wire 61 is arranged adjacent the end of the adjustable stop-plate 53, as shown in Figs. 2 and 3, and as the pat of butter is cut from the protruded portion, the resilient butter discharging finger 50 is forced upwardly as it passes over the cutting wire and gives the pat of butter an impulse whereby it is promptly discharged downwardly through the open space between the rear end of the adjustable stop-plate 53 and the front end of the stationary stop-plate 51.

The cutting member 61 is disposed at a suitable level which may be substantialy even with reference to the stationary stop-plate 51, as shown in Fig. 3. The end of the arcuate plate 51 is spaced from the end of the adjustable plate 53 by a distance which is less than the thickness of the butter, as shown in Fig. 2, so that the newly exposed end of the piece of butter in the chute 33 is then engaged on the upper face of the stationary stop-plate 51 and the chute 33 thus carries the larger or upper piece of butter directly across above the opening. The butter cannot fall through the opening because its thickness is greater than the distance between the open ends of the stationary plate 51 and the adjustable plate 53 as may be judged from the width of the butter chute 33, as shown in Fig. 2. In this manner the front end of the stationary stop-plate 51 supports the large piece of butter in the chute and because it enters between the two pieces of butter it also aids in separating and discharging the small pat of butter downwardly as the chute revolves. By adjusting the knurled knob 57 the adjustable stop-plate may be lowered to increase or decrease the protrusion of the butter before it engages the cutting member, whereby the thickness of the butter pats is conveniently regulated.

The rotatable butter carrier is driven by a bevelled gear 69, which is secured upon the lower end of the vertical shaft 27 by a key or any suitable means. A manually actuatable shaft 71 is journalled horizontally in the sidewall of a gear housing 73 which projects downwardly from the base plate 14. A small bevelled gear 75 is secured upon the inwardly directed end of the horizontal shaft 71 in any suitable manner for operatively meshing with the bevelled gear 69 on the vertical shaft. The horizontal shaft 71 extends through a suitable aperture 70 in the sidewall of the pedestal 19 and it carries a handcrank 77 at its outer end.

The upper end of the heat insulating enclosure is closed by a cover 80 of heat insulating construction comprising spaced walls 81 and 83 presenting a flat peripheral rim 84 adapted to rest upon the upper edge of the enclosure as shown in Fig. 3. A smaller cover 85 closes the cutter compartment 39.

In operation my butter cutting and dispensing machine is installed upon a convenient table or counter, the butter chutes 33 are charged with one-fourth pound cakes of butter, the refrigerant compartment 41 is charged with cracked ice or other refrigerant, and the compartments of the machine are closed by the covers 80 and 85.

When butter pats are desired, a plate is inserted through the aperture 23 and the handcrank 77 is manipulated to turn the butter carrier. As the butter chutes 33 are moved over the butter cutting wire 61, refrigerated butter pats of the desired thickness are deposited upon the plate.

It will be seen that I have provided a butter cutting and dispensing machine which is convenient for use in hotels and restaurants, which is of simple construction, conveniently chargeable and adjustable, and which is refrigerated for instant use.

Aside from the specific embodiment of my invention, herein shown and described, it will be understood that numerous details of the construction may be altered or omitted without departing from the spirit and scope of the invention as disclosed and claimed, and that I do not desire to limit the invention to the exact construction herein set forth.

I claim:

1. A butter cutting and dispensing machine comprising revolvable means for carrying a large piece of butter, means for determining the protrusion of the butter carried by said revolvable means, and butter cutting means disposed adjacent the path of movement of said revolvable means for cutting off a pat of butter from the protruded portion of the large piece of butter as it is carried by said revolvable means.

2. A butter cutting and dispensing machine comprising movable means for carrying a large piece of butter slidably supported thereon, adjustable stop means for determining the protrusion of butter therefrom, and butter cutting means disposed adjacent the path of travel of said movable means for cutting off a pat of butter from the protruding portion of the large piece of butter as it is carried by said movable means.

3. A butter cutting and dispensing machine comprising revolvable means for carrying a large piece of butter slidably supported therein, adjustable means for determining the protrusion of butter therefrom, and a butter cutting member disposed adjacent the path of travel of said revolvable means for cutting a pat of butter from the portion protruding from said revolvable means.

4. A butter cutting and dispensing machine comprising a revolvable means for carrying a large piece of butter slidably supported therein, a stop-plate for determining the protrusion of the butter from said revolvable means during a portion of its movement, a second stop-plate spaced for limiting the protrusion of the butter from the revolvable means during a different portion of its movement and for defining a discharge aperture with said first plate, means for adjusting the position of said second stop-plate to determine the degree of protrusion of the butter from the revolvable means, and a butter cutting member disposed adjacent the path of movement of said revolvable means for cutting off a pat of butter from the protruded portion thereof after it has passed adjacent said second stop-plate.

5. A butter cutting and dispensing machine comprising a revolvable butter carrier having a vertically disposed butter chute for receiving a piece of butter slidably disposed therein, means for limiting the protrusion of the butter from the lower end of said chute, and a butter cutting member adjacent the path of travel of said revolvable butter carrier for cutting off a pat of butter from the portion protruding from the end of said chute.

6. A butter cutting and dispensing machine comprising a revolvable butter carrier having a vertically disposed butter chute for receiving a piece of butter slidably disposed therein and a tensioned cutting wire arranged adjacent the path of movement of said chute for cutting off a pat of butter from a portion of the large piece of butter which protrudes from said chute.

7. A butter cutting and dispensing machine comprising a revolvable butter carrier having a vertically disposed butter chute for receiving a piece of butter slidably disposed therein, a stop-plate adjacent the lower end of said chute for limiting the slidable movement of said piece of butter during a portion of the revolution of said chute, a second stop-plate spaced for limiting the protrusion of the butter from the lower end of said chute during a different portion of its revolution and for defining a discharge aperture with said first plate, means for adjusting the position of said second stop-plate relative to said first stop-plate, and a butter cutting member adjacent the path of movement of said chute for cutting a pat of butter from the piece protruding from the chute.

8. A butter cutting and dispensing machine comprising revolvable means for carrying a large piece of butter, means for limiting the protrusion of the butter carried by said revolvable means, a butter cutting member disposed adjacent the path of travel for cutting off a pat of butter from the protruded portion of the large piece of butter carried by said revolvable means, and means actuated by the movement of said revolvable means for discharging the pat of butter.

9. A butter cutting and dispensing machine comprising revolvable means for carrying a large piece of butter, means for limiting the protrusion of butter from said revolvable means, a tensioned wire disposed adjacent the path of travel of said revolvable means for cutting off a pat of butter from the protruded butter carried by said rotatable means, means actuated by the movement of said revolvable means for discharging the pat of butter, and means for preventing backward movement of said revolvable means.

10. A butter cutting and dispensing machine comprising a revolvable butter carrier including a plurality of butter chutes in vertically disposed position for receiving large pieces of butter slidably disposed therein, a stationary stop-plate for limiting the protrusion of the butter from the lower ends of said chutes during a portion of their rotation, a second stop-plate, spaced for limiting the protrusion of butter from the lower ends of said chutes during a different portion of their revolution and for defining a discharge aperture, means for adjusting the position of said second stop-plate relative to said first stop-plate, butter cutting means adjacent the path of movement of said carrier for cutting off pats of butter from the portions protruding from the lower ends of said chutes, means actuated by the movement of said chutes for discharging the pats of butter, means for preventing backward rotation of said carrier, and manually actuated means for operating said revolvable carrier.

11. A butter cutting and dispensing machine comprising a revolvable butter carrier having a vertically disposed butter chute for receiving a piece of butter slidably disposed therein, a tensioned cutting wire mounted adjacent the path of travel of said butter chute for cutting a pat of butter from a portion of the large piece of butter which protrudes from said chute, and a resilient butter discharging finger projecting downwardly and backwardly from said butter carrier for discharging the pat of butter away from the stop-plate and the cutting wire.

12. A butter cutting and dispensing machine comprising a revolvable butter carrier having a vertically disposed butter chute for receiving a piece of butter slidably disposed therein, a stop-plate mounted in spaced relation under the lower end of said butter chute for limiting the protrusion of the butter from the lower end of the chute as it moves with the rotatable carrier, a butter cutting member adjacent the path of travel of the lower end of said butter chute as it approaches the edge of the stop-plate for cutting a pat of butter from the piece protruding from the chute, and a resilient butter discharging finger projecting downwardly from said revolvable butter carrier for discharging the pat of butter away from the stop-plate and the cutting member.

13. A butter cutting and dispensing machine comprising a revolvable butter carrier having a vertically disposed butter chute for receiving a piece of butter slidably disposed therein, means for cutting a pat of butter from said piece of butter as the chute revolves, stop means for limiting the protrusion to determine the thickness of the butter pat, said stop means defining a discharging port for discharging the butter pat, and means for retaining the piece of butter in the chute while the pat is separated therefrom.

14. A butter cutting and dispensing machine comprising a revolvable butter carrier having a vertically disposed butter chute for receiving a piece of butter slidably disposed therein, means for cutting a pat of butter from said piece of butter as the chute rotates, stop means for limiting the protrusion of the butter from said chute to determine the thickness of the butter pat, said stop means defining a discharging port for discharging the butter pat, means for retaining the piece of butter in the chute while the pat is separated therefrom, and a resilient finger projecting downwardly from said revolvable butter carrier for discharging the pat of butter through the discharging port.

15. A butter cutting and dispensing machine comprising in combination a heat insulating enclosure, partition means for providing a refrigerant compartment and a cutting compartment in close coupled thermal relation therein, a base plate comprising bearing means, a shaft journalled in said bearing means, a butter carrier revolvably supported by said shaft and comprising a butter chute for slidably receiving a piece of butter, and a cutting member disposed adjacent the path of travel of said butter chute for cutting pats of butter from said piece of butter as the chute revolves.

16. A butter cutting and dispensing machine comprising in combination a heat insulating enclosure, partition means for providing a refrigerant compartment and a cutting compartment in close coupled thermal relation therein, a base plate comprising bearing means, a shaft journalled in said bearing means, a butter discharging port in said base plate, a butter carrier revolvably supported by said shaft and comprising a butter chute for slidably receiving a piece of butter, a cutting member disposed adjacent the path of travel of said butter chute for cutting pats of butter from said piece of butter as the chute revolves adjacent said butter discharging port, and manually actuable means for revolving said butter carrier.

17. A butter cutting and dispensing machine comprising in combination substantially cylindrical shells disposed in concentrically spaced relation, a base plate comprising means for securing said shells in spaced relation, bearing means in said base plate, a cutting member mounted on said base plate, a shaft journalled in said bearing means, and a butter carrier revolvably supported by said shaft for carrying pieces of butter adjacent said member for cutting pats of butter therefrom.

18. A butter cutting and dispensing machine comprising in combination substantially cylindrical shells disposed in concentrically spaced relation, a base plate comprising means for securing said shells in spaced relation, bearing means in said base plate, a cutting member mounted on said base plate, a shaft journalled in said bearing means, a butter carrier revolvably supported by said shaft for carrying pieces of butter adjacent said member for cutting pats of butter therefrom, and manually actuable means extending from said pedestal member for rotating said shaft.

19. A butter cutting and dispensing machine comprising a vertical butter receiving chute, a butter cutting member, means supporting said chute for movement to pass the lower end of the chute adjacent the cutting member, and means actuated by the movement of said chute to flex and vibrate the walls of the chute to feed the butter to the cutting member.

20. A butter cutting and dispensing machine comprising a vertical butter receiving chute, a butter cutting member, means supporting said chute for movement to pass the lower end of the chute adjacent the cutting member, a member projecting from said chute, and stationary means engageable by said member whereby the movement of the chute flexes and vibrates the walls thereof to feed the butter down to the cutting member while preventing backward movement of the chute.

21. A butter cutting and dispensing machine comprising a butter cutting member, a slotted butter chute, and means for supporting said slotted butter chute vertically in relatively movable relation adjacent said butter cutting member for feeding butter thereto by gravity.

22. A butter cutting and dispensing machine comprising a butter cutting member, a slotted butter chute, means for supporting said slotted butter chute vertically in relatively movable relation adjacent said butter cutting member for feeding butter thereto by gravity, and means for vibrating the side walls of said chute as it moves relative to said butter cutting member.

23. A butter cutting and dispensing machine comprising a butter feeding chute, a butter cutting member, means for supporting said chute and said butter cutting member in relatively movable relation, a stop plate for limiting the protrusion of butter from one end of said chute, and a ridge on the adjacent surface of said stop plate for engaging the protruded end of butter carried by said chute.

24. A butter cutting and dispensing machine comprising a butter feeding chute, a butter cutting member, means for supporting said chute and said butter cutting member in relatively movable relation, a stop-plate for limiting the protrusion of butter from one end of said chute, a second stop-plate adjustable relative to said first stop plate, and butter engaging ridges on the surfaces of said stop-plates for engaging the protruded end of the butter.

FRANK W. KNOTT.